(12) United States Patent
Ziech

(10) Patent No.: US 7,500,934 B2
(45) Date of Patent: Mar. 10, 2009

(54) DRIVE SYSTEM AND METHOD OF ASSEMBLY THEREOF

(75) Inventor: James F. Ziech, Kalamazoo, MI (US)

(73) Assignee: Dana Heavy Vehicle Systems Group, LLC, Toledo, OH (US)

( * ) Notice: Subject to any disclaimer, the term of this patent is extended or adjusted under 35 U.S.C. 154(b) by 1002 days.

(21) Appl. No.: 10/702,785

(22) Filed: Nov. 6, 2003

(65) Prior Publication Data

US 2005/0101430 A1   May 12, 2005

(51) Int. Cl.
*F16H 48/06* (2006.01)
(52) U.S. Cl. .................................. 475/221; 475/246
(58) Field of Classification Search ................. 475/230, 475/246–7, 221, 225; 384/247, 257–8
See application file for complete search history.

(56) References Cited

U.S. PATENT DOCUMENTS

| | | | |
|---|---|---|---|
| 1,492,380 A | 4/1924 | Leipert | |
| 1,523,060 A | 1/1925 | Eckhart | |
| 1,670,119 A | 5/1928 | Marcum | |
| 1,791,138 A | 2/1931 | Masury | |
| 1,856,748 A | 5/1932 | Davis | |
| 1,992,365 A | 2/1935 | Fageol | |
| 2,291,174 A | 7/1942 | Stewart | |
| 2,693,244 A | 11/1954 | Rockwell et al. | |
| 2,699,075 A | 1/1955 | Buckendale | |
| 3,532,183 A * | 10/1970 | Shealy | 475/160 |
| 3,887,037 A * | 6/1975 | Haluda et al. | 475/160 |
| 4,004,472 A * | 1/1977 | Millward et al. | 475/247 |
| 4,273,391 A * | 6/1981 | Asberg | 384/494 |
| 6,200,240 B1 | 3/2001 | Oates | |
| 6,425,840 B1 | 7/2002 | Johansson | |
| 6,544,140 B2 * | 4/2003 | Gradu et al. | 475/246 |
| 6,648,788 B1 | 11/2003 | Sullivan | |
| 6,719,661 B2 * | 4/2004 | Turner et al. | 475/230 |
| 6,840,882 B2 * | 1/2005 | Oates et al. | 475/221 |
| 6,852,058 B2 | 2/2005 | Oates et al. | |
| 2004/0079562 A1 | 4/2004 | Oates et al. | |
| 2004/0176206 A1 | 9/2004 | Oates et al. | |
| 2005/0032600 A1 * | 2/2005 | Ziech et al. | 475/220 |

FOREIGN PATENT DOCUMENTS

| | | |
|---|---|---|
| GB | 743027 | 1/1956 |
| GB | 807425 | 1/1959 |
| GB | 1 403 730 | 8/1975 |
| GB | 2 029 521 A | 3/1980 |

* cited by examiner

*Primary Examiner*—Roger Pang
(74) *Attorney, Agent, or Firm*—Marshall & Melhorn LLC

(57) ABSTRACT

A drive system comprises a one-piece differential carrier housing an input assembly, a power divider, a hollow pinion gear and a wheel differential. A through shaft is concentric with, but rotates independently of, the hollow pinion gear. The input assembly, the power divider and the pinion gear are rotatingly supported within the one-piece differential carrier by a maximum of three bearings. The bearing cage and the pinion gear are assembled through the rear of the one-piece differential carrier.

16 Claims, 7 Drawing Sheets

DRIVE SYSTEM AND METHOD OF ASSEMBLY THEREOF

FIELD OF THE INVENTION

The present invention relates to a drive system, comprising a one-piece differential carrier and a bearing cage attached thereto, and a method of assembly thereof.

BACKGROUND OF THE INVENTION

Those skilled in the art know that in traditional tandem axle systems a forward drive assembly is used to distribute rotational power from a driveline to a set of forward wheels and a rear drive assembly is used to distribute rotational power from the driveline to a set of rear wheels. The forward drive assembly comprises a left-handed ring gear and a right-handed pinion and the rear drive assembly has a right-handed ring gear and left-handed pinion. The forward drive assembly also traditionally has a set of helical gears used to transfer half of the rotational power from an inter-axle differential to the forward axle pinion and ring gear.

In one type of tandem axle system described in UK Patent Application No. 2,029,521, a drive unit for a tandem axle vehicle is taught having two differential gear units located within a three-part housing. The drive unit comprises coaxially aligned input and output members and opposed laterally extending axle shafts. The first differential gear unit has a differential casing driven by the input member, a first output gear driving a hollow hypoid pinion and second output gear driving the output member. The second output gear drives the output member via a through shaft which is coaxial with the input and output members. The through shaft extends through the hollow hypoid pinion. The second differential gear unit is offset to the side of the through shaft. The second differential gear unit comprises a differential casing driven by a hypoid gear, which itself is driven by the hypoid pinion. Output gears in the second differential gear unit drive the axle shafts.

Great Britain Patent No. 743,027 teaches a tandem axle system comprising basins 10, 10a and associated hollow axle arms 11, 11a. The hollow axle arms contain live axles to drive the wheels. The front axle comprises a hypoid pinion and a hypoid crown wheel transmitting the drive to a differential gear 14 via a hollow shaft carrying a pinion. A shaft located through the hollow shaft and the pinion transmits drive to the rear axle.

U.S. Pat. No. 1,791,138 provides for a single rear axle drive located in a housing in one embodiment. Power is provided to the rear axle by the transmission shaft x to the solid shaft g. The solid shaft transmits power to the hollow shaft e through hub h and sleeve $h^1$. The ring gear is driven by the pinion, which is mounted on the hollow shaft. The housing provides for a support for bearing $k^5$ and $k^6$.

The above-described prior art design requires distinct parts to be used for the forward and rear drive assemblies. The distinct parts undesirably require manufacturers to produce and maintain a large and expensive parts inventory. Additionally, the distinct parts increase the complexity and expense of tandem axles.

The helical gears are also disadvantageous to known tandem axles. Specifically, the helical gears result in a different axis height between the forward axle output and the rear axle input. The height difference requires different axle pinion angles to be used for the interaxle u-joint driveline angles. When these angles are not the same, or not nearly the same, adverse torsional loading and vibration in the drivetrain assembly may result.

Tandem axle differential housings that do not require helical gears are known to those skilled in the art. For example, U.S. Pat. No. 6,200,240 provides for a forward drive assembly comprising a power divider and a hollow, forward pinion gear. A through shaft is located through the forward pinion gear, although the through shaft does not rotate with the forward pinion gear. The forward pinion gear rotates a main differential and the through shaft rotates a rear pinion gear of the rear differential. The forward pinion gear, the through shaft and the rear pinion gear are taught to be coaxial.

The power divider and the forward pinion gear are rotatably supported within a differential cover by an input bearing and a power divider differential bearing. A bearing cage is attached to the differential cover to support an outer pinion bearing for the forward pinion. A first shim pack, as known to those skilled in the art, is likely required to ensure the proper position of the pinion gear. Additionally, a second shim pack is also required to set the preload for the outer and inner pinion bearings. The forward drive assembly also has an inner pinion bearing for the forward pinion and a left half differential bearing and a right half differential bearing for the main differential.

The above-described design has several disadvantages. For example, a minimum of four bearings are used to rotatably support the input assembly, power divider and pinion gear. Each bearing adds cost and complexity to the design. Furthermore, as mentioned above, some differential carrier housings require a shim pack to position the pinion gear and another shim pack to preload the pinion bearings. Installation of each shim pack leads to increased cost, complexity and assembly time. Additionally, the carrier housing, which includes the bearing cage and a cover, can allow fluid to leak from the differential and/or allow contaminants into the differential.

SUMMARY OF THE INVENTION

The present invention is directed toward a drive system comprising a one-piece differential carrier housing an input assembly, a power divider, a hollow pinion gear and a wheel differential. A through shaft is concentric with, but rotates independently of, the hollow pinion gear. The input assembly, the power divider and the pinion gear are rotatingly supported within the one-piece differential carrier by a maximum of three bearings.

BRIEF DESCRIPTION OF THE DRAWINGS

The above, as well as other advantages of the present invention, will become readily apparent to those skilled in the art from the following detailed description when considered in the light of the accompanying drawings in which:

FIG. 3a is a schematic top view of a portion of the invention depicted in FIG. 2a;

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
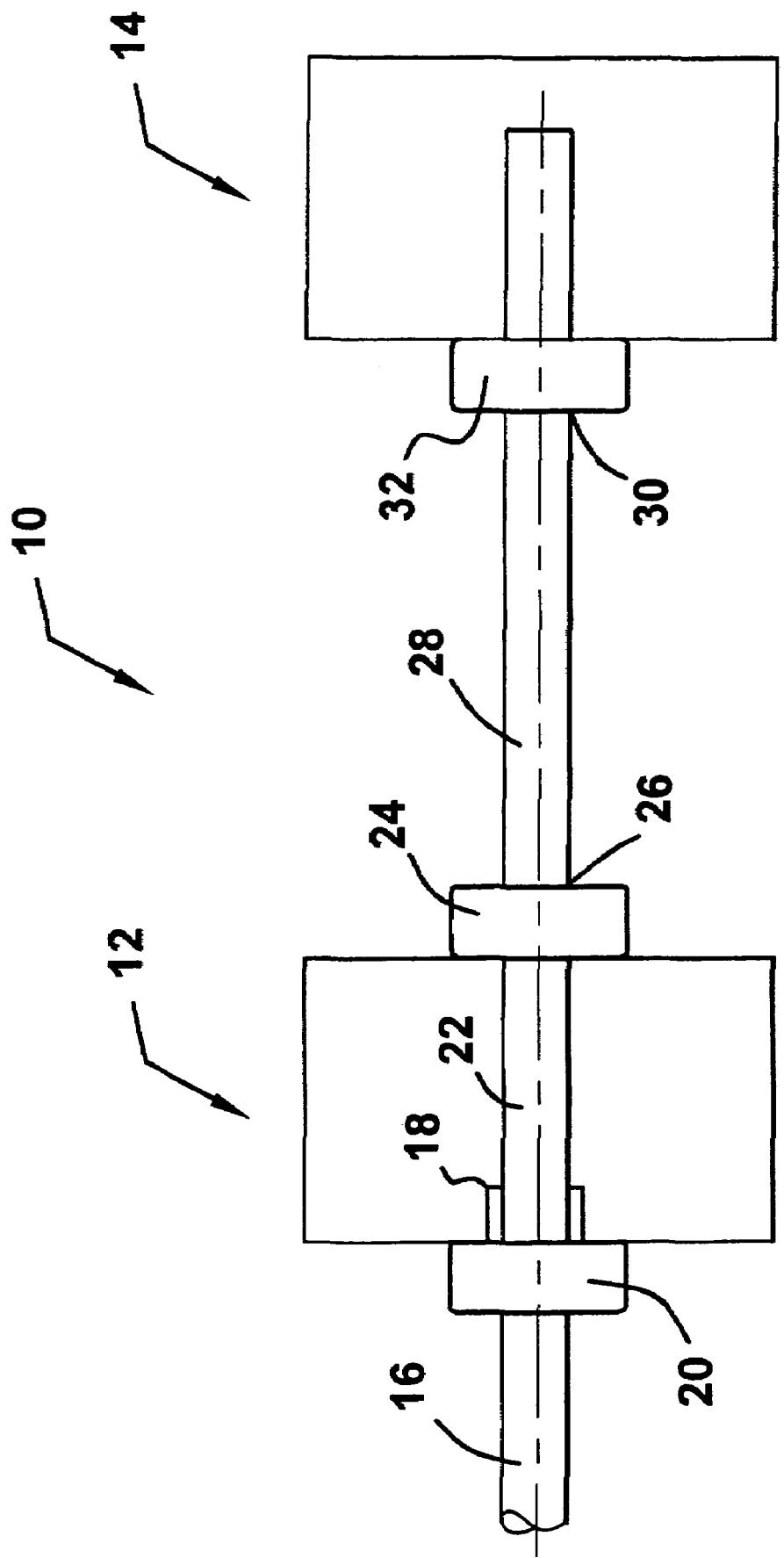
FIG. 1 is a schematic view of an embodiment of the present invention.

Referring now to FIG. 1, a tandem axle 10 is schematically depicted comprising a forward drive system 12 and a rear drive system 14. An engine (not shown) provides rotational power to a first driveline 16 as known by those skilled in the art. The first driveline 16 is connected to an input assembly 18 of the forward drive system 12 by a first yoke 20.

A through shaft 22 transfers power from the forward drive assembly 12 to a second yoke 24. The second yoke 24 is connected to one end 26 of a second driveline 28. The other end 30 of the second driveline 28 is connected to a third yoke 32. The rear drive assembly 14 is connected to the second driveline 28 through the third yoke 32. A drive shaft (not shown) within the rear drive assembly 14 provides rotational power to the rear wheels (not shown) as known by those skilled in the art.

FIG. 1 schematically depicts one embodiment of the present invention where the forward drive system 12 is axially aligned with the rear drive system 14. Those skilled in the art will readily appreciate, however, that the present invention can be used if the forward drive system 12 and the rear drive system 14 are non-axially aligned.

Figure 2A:
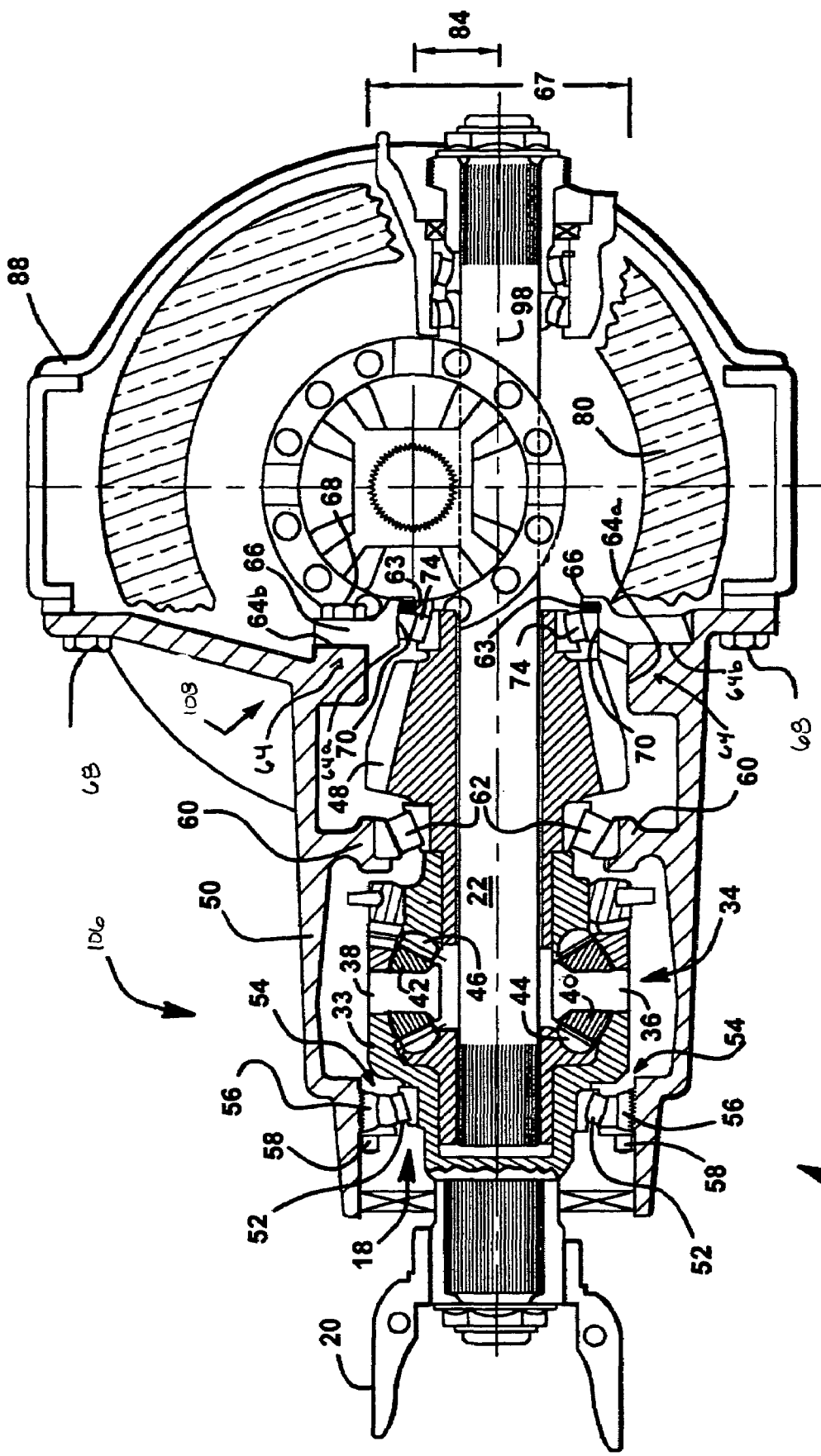
FIG. 2a is a schematic side view of a component of the invention depicted in FIG. 1.
Figure 2B:
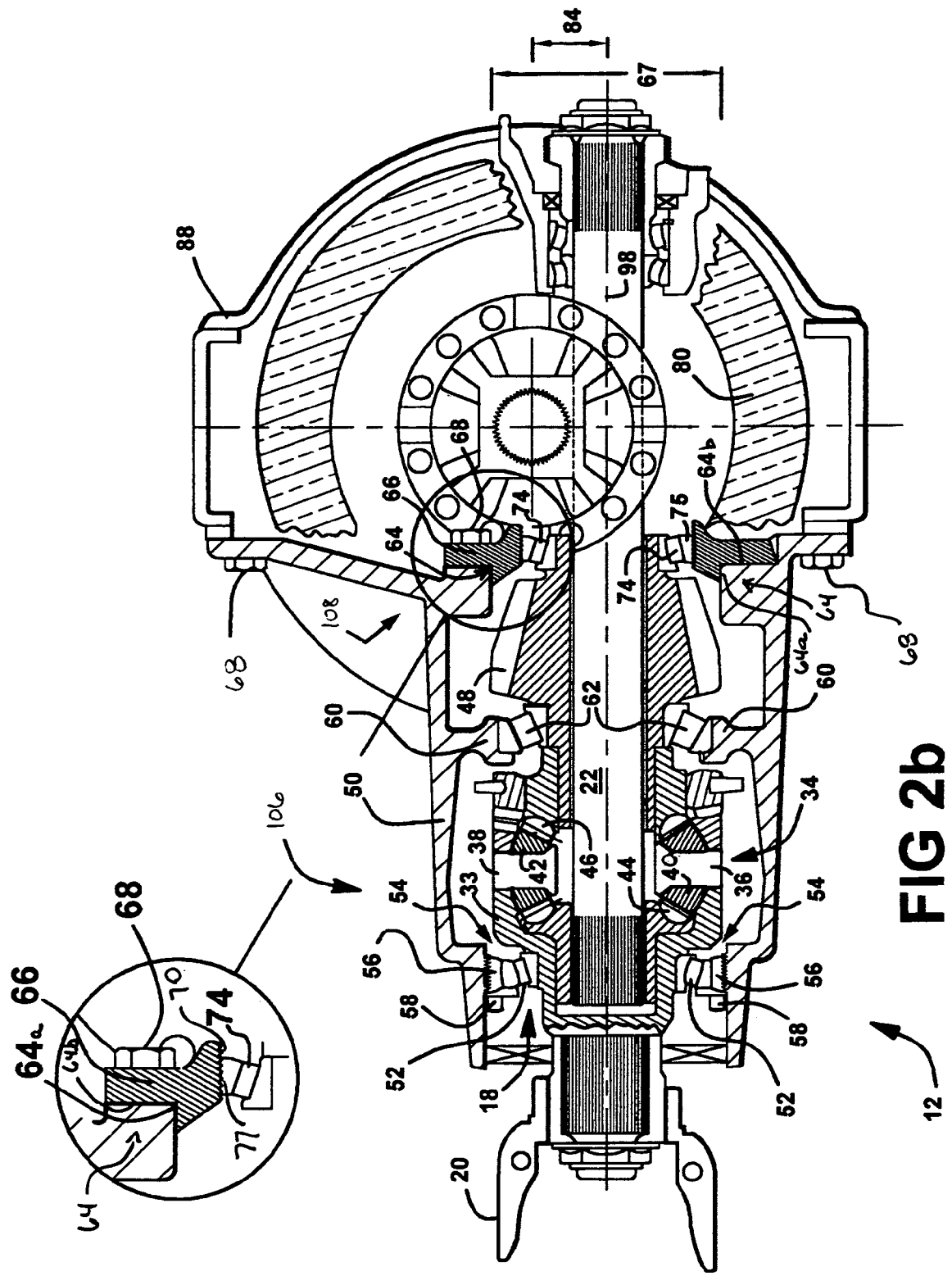
FIG. 2b is an alternative embodiment of a component of the invention depicted in FIG. 1.

Referring now to FIGS. 2a and 2b, a partial, cross-sectional side view of the forward drive system 12 is schematically depicted. Reference numbers depicting identical components of the invention are used in FIGS. 1, 2a and 2b. The first yoke 20 is connected to the input assembly 18 by means known to those skilled in the art to cause the input assembly 18 to rotate with the first yoke 20. The input assembly 18 comprises case 33 and power divider 34 and provides rotational power to both. The power divider 34 comprises spider shafts 36, 38. The spider shafts 36, 38 in turn rotate spider gears 40, 42, respectively. The spider gears 40, 42 rotate side gear 44 and side gear 46.

Side gear 44 is connected to one end of the through shaft 22. Side gear 46 is rotatably connected to a hollow pinion gear 48. The through shaft 22 extends concentrically through the hollow pinion gear 48, but rotates independently from it.

A stationary, one-piece differential carrier 50 comprises a housing for the input assembly 18, the power divider 34, the hollow pinion gear 48 and wheel differential 51. Preferably, an input bearing 52 is located adjacent the input assembly 18 to facilitate its rotation. The input bearing 52 is preferably located adjacent an input bearing support 54. The input bearing support 54 can be integrally formed with the carrier 50, formed separately therefrom or supported separately therefrom. In one embodiment, the input bearing 52 can be supported by a bearing adjuster 56 as known by those skilled in the art. A lock 58, such as a bolt, clip, cotter pin, metal stamping and/or deformable member is needed to maintain the position of the bearing adjuster 56. In another embodiment (not depicted), the input bearing 52 can be supported by a shimmed cover as known by those skilled in the art.

An outer pinion bearing support 60 is connected to the carrier 50 and supports an outer pinion bearing 62 against the pinion gear 48. Commercially available, tight tolerance bearings known to those skilled in the art are preferably used at least for the outer pinion bearing 62.

Preferably, the outer pinion bearing support 60 is integrally formed from the carrier 50 although it is well within the scope of the present invention to separately form and/or insert the outer pinion bearing support 60 within the carrier 50. Regardless of the form of the outer pinion bearing support 60, it is preferably dimensioned and/or machined to support the outer pinion bearing 62 in a precise, pre-determined location adjacent the pinion gear 48. The outer pinion bearing 62 supports the pinion gear 48 in an exact location thus setting its position without the need for a shim pack.

In the preferred embodiment depicted in FIGS. 2a, 2b, 3a and 3b, the carrier 50 includes at least one bearing cage support surface 64. Preferably, the bearing cage support surface 64 comprises a horizontal surface 64a and a vertical surface 64b to complement the design of a bearing cage 66. Those skilled in the art understand that a bearing cage support surface in any orientation is within the scope of the present invention. In an alternative embodiment, the bearing cage support surfaces 64a and 64b can be dimensioned and/or machined to support the bearing cage 66 in a pre-determined location. A precise position of the bearing cage 66 on the surfaces 64a and 64b can contribute to the elimination of a shim pack to set the position of the pinion gear 48.

The bearing cage 66 is preferably attached to at least one bearing cage support surface 64 and positioned by pilot diameter 67. Pilot diameter 67 defines an aperture bounded by horizontal surface 64a in the carrier 50. The bearing cage 66 may be attached by any means known to those skilled in the art, including but not limited to, male/female couplings, screws, clamps, friction fittings, dowels and/or pins and combinations thereof. Preferably, a plurality of bolts 68 attach the bearing cage 66 to the bearing cage support surface 64b within the one-piece differential carrier 50, as shown in FIGS. 2a, 2b, 3a, 3b, and 4. Reference numbers depicting identical components of the invention are used in FIGS. 2a, 2b, 3a, 3b and 4.

As seen in FIGS. 2a, 2b, 3a, 3b and/or 4, the bearing cage 66 has an inner pinion bearing support surface 70 and a half differential bearing support surface 72. An inner pinion bearing 74 is located adjacent the inner pinion bearing support surface 70. Tight tolerance bearings may also be used to ensure a precision fit for the inner pinion bearing 74 in addition to the input bearing 52.

In addition, or alternatively, the bearing cage 66 may be dimensioned and/or machined to support the inner pinion bearing 74 in a precise, pre-determined location adjacent the pinion gear 48. The inner pinion bearing 74 supports the pinion gear 48 in an exact location thus setting its position without the need for a shim pack.

Figure 3A:
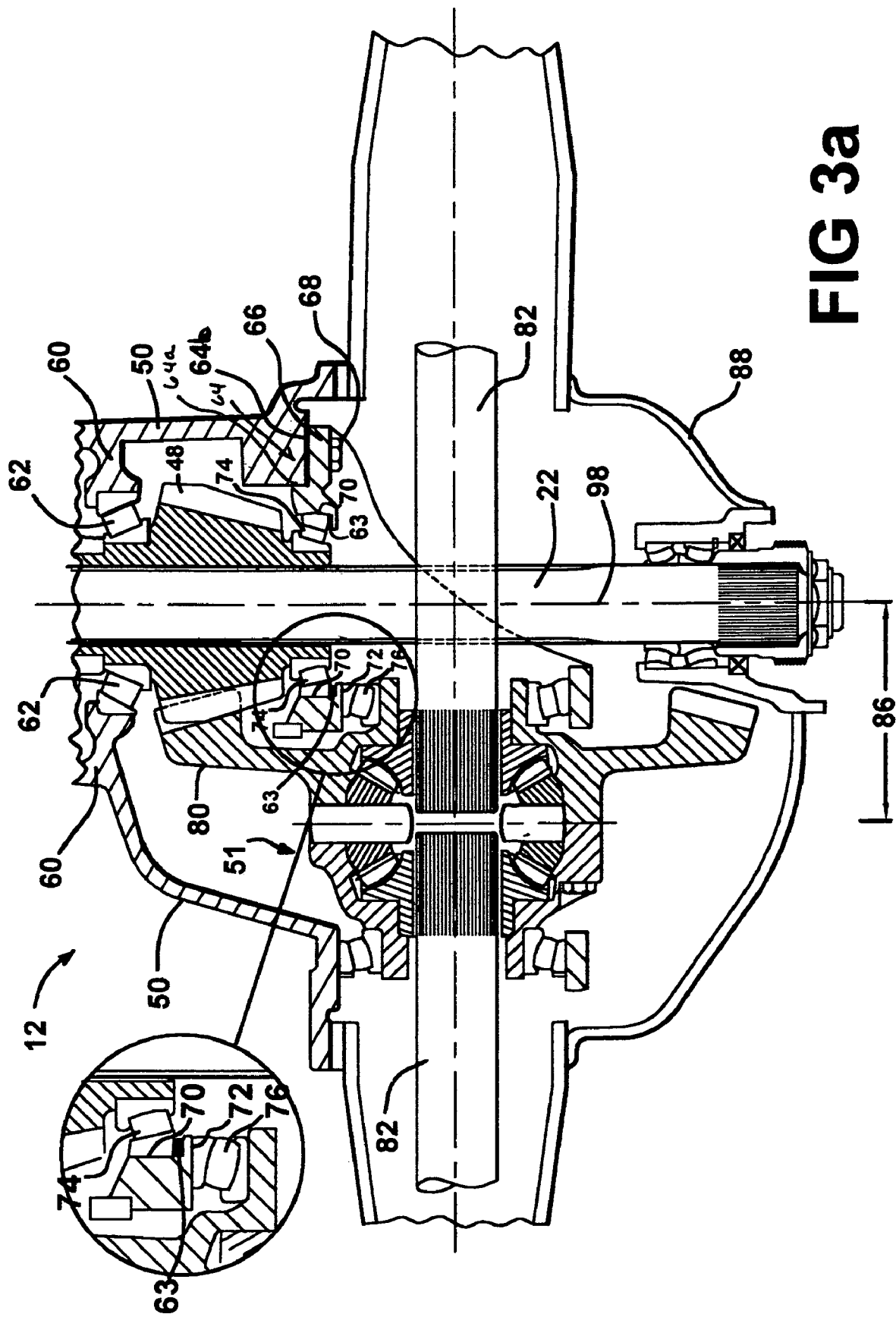

As provided above, the precise location of at least the outer pinion bearing 62 properly locates the pinion gear 48 such that a shim pack to set the position of the pinion gear 48 is not needed. Preferably, however, a shim pack 63 to adjust the inner pinion bearing and the outer pinion bearing preload, as known to those skilled in the art, is utilized, as shown in FIGS. 2a and 3a. The shim pack 63 is depicted in FIGS. 2a and 3a adjacent the inner pinion bearing 74. Those skilled in the art will appreciate, however, that the shim pack can be located adjacent the outer pinion bearing without departing from the scope of the present invention.

Figure 3B:
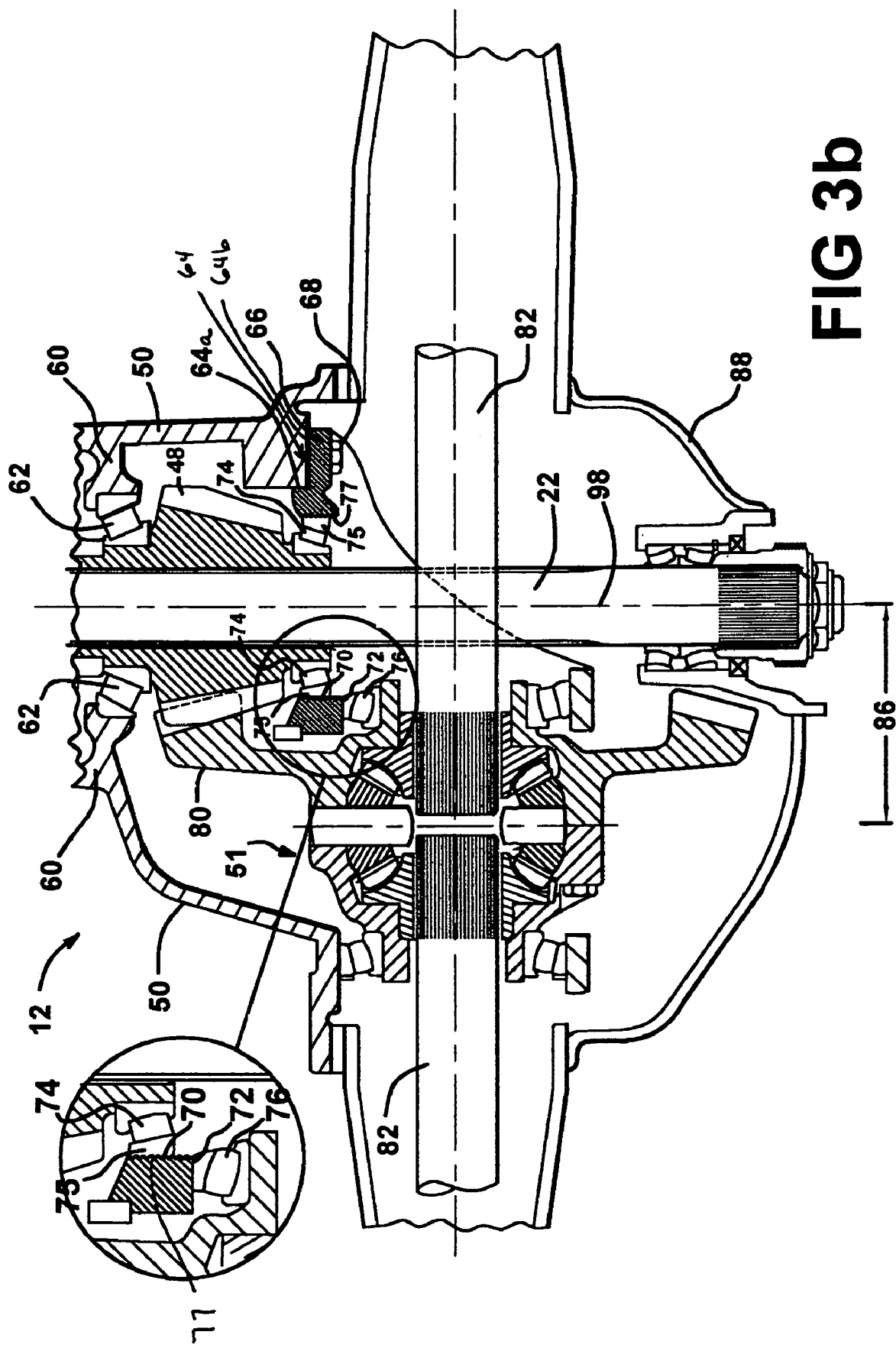
FIG. 3b is a schematic top view of a portion of the invention depicted in FIG. 2b.
Figure 4:
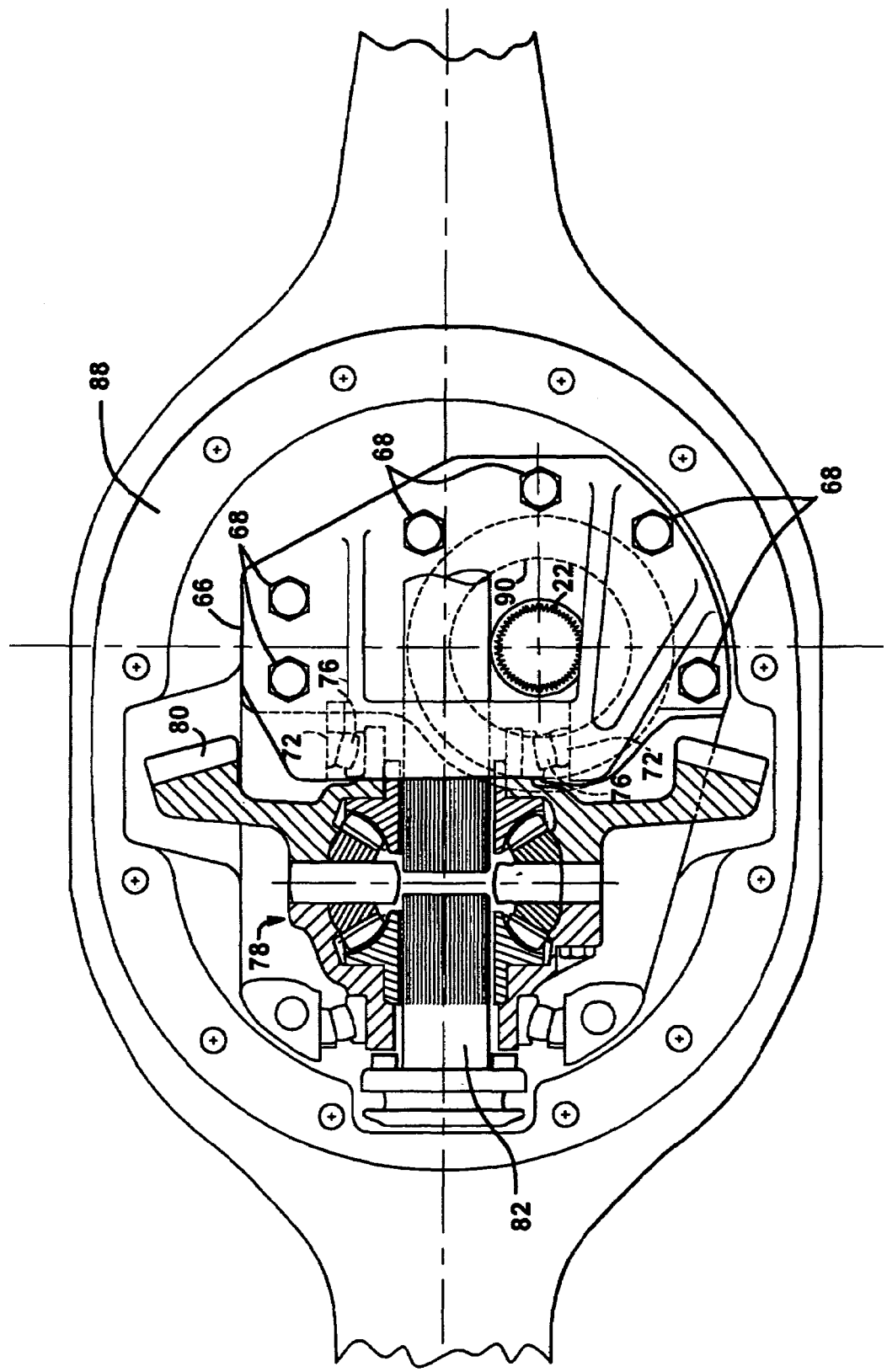
FIG. 4 is a schematic rear view of the present invention.

In the embodiment depicted in FIGS. 2b and 3b, a threaded inner pinion bearing cup 75 engages complimentary threads 77 on bearing cage 66. The inner pinion bearing cup 75 can be rotated in or out of the bearing cage 66 to adjust the inner pinion bearing and the outer pinion bearing preload. Those skilled in the art appreciate that a threaded outer pinion bearing cup (not shown) may be threadably engaged with the carrier 50 to adjust the inner pinion bearing and the outer pinion bearing preload.

As shown in FIGS. 3a and 3b, a half differential bearing 76 is located adjacent the half differential bearing support surface 72. The half differential bearing 76 is located adjacent the main differential 51 to facilitate its rotation as provided by a ring gear 80 connected to the pinion gear 48 as known by those skilled in the art.

The design described above allows the input assembly 18, the power divider 34 and the pinion gear 48 to be rotatingly supported within the one-piece differential carrier 50 by a maximum of three bearings. Those bearings comprise the input bearing 52, the outer pinion bearing 62 and the inner pinion bearing 74.

The main differential 51 is connected to forward axles 82 within the forward drive assembly 12. Preferably, the pinion gear 48 and ring gear 80 have a hypoid offset 84 sufficient to allow the through shaft 22 to pass under the forward axles 82, as seen in FIGS. 2a, 2b, 3a and 3b. The main differential 51 has an offset 86 so as not to interfere with the through shaft 22 as shown in FIGS. 3a and 3b. The main differential 51 and forward axles 82 are housed within an axle housing 88 as known by those skilled in the art.

As seen in FIGS. 2a, 2b, 3a, 3b, 4 and/or 5, the through shaft 22 passes through pilot diameter 67 in the bearing cage 66 and is connected to the second yoke 24 to power the rear drive assembly 14.

Figure 5:
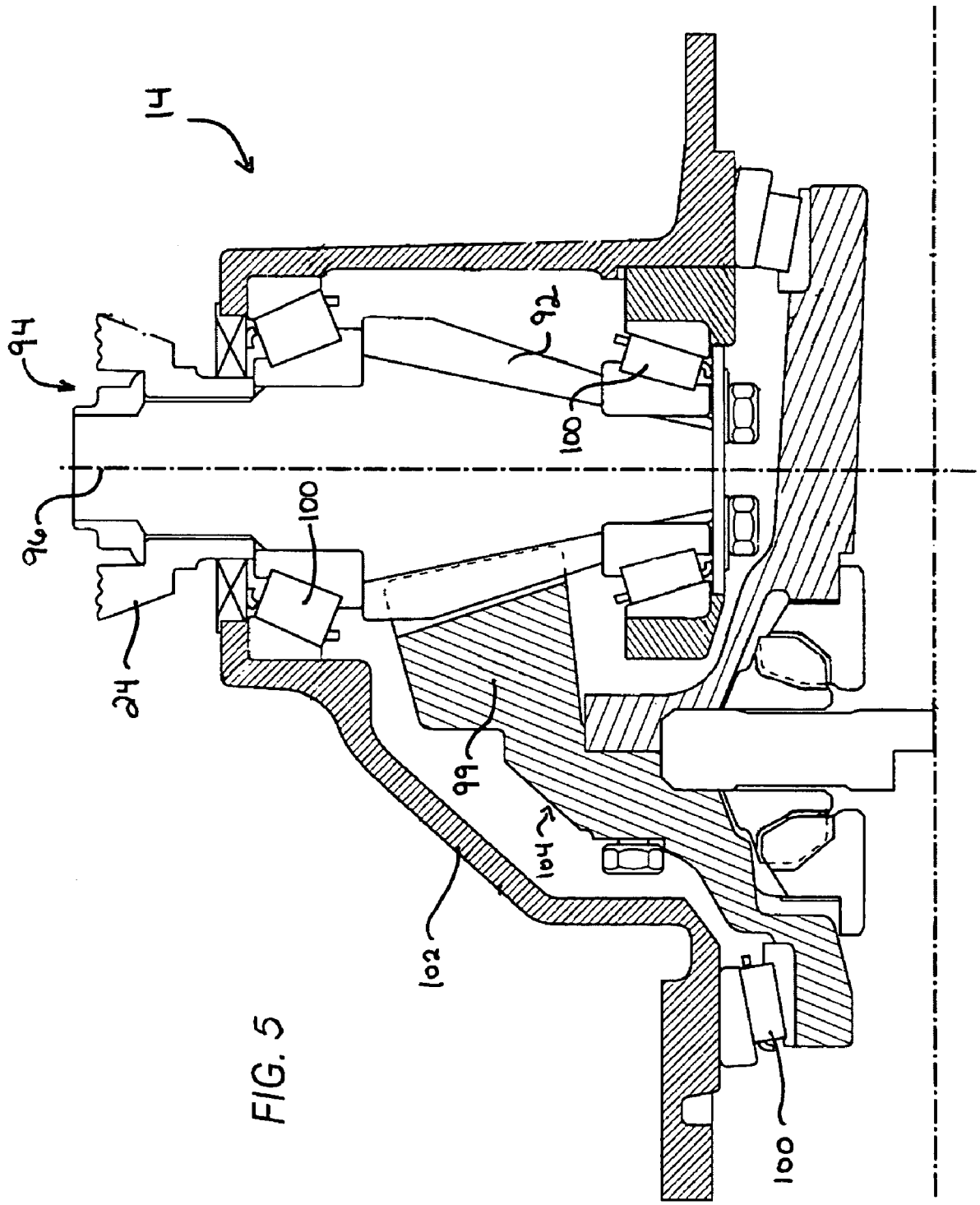
FIG. 5 is a schematic top view of a component of the invention depicted in FIG. 1.

FIG. 5 schematically depicts a cross-sectional view of a rear drive system 14. The rear drive system 14 is described in the assignee's pending patent application Ser. No. 10/637, 393 titled Straddle Mount Single Drive Axle Pinion Support, which is fully incorporated by reference herein. Rear drive system 14 comprises a rear pinion gear 92 having one end 94 secured to the third yoke 32 (shown in FIG. 1). In one embodiment depicted in FIGS. 1 and 5, the end 94 is located on an axis 96 that is the same axis as an axis 98 of the through shaft 22, and thus an axis of the forward pinion gear 48 also. In another embodiment of the present invention (not depicted), axis 96 is not the same axis as axis 98.

In the embodiment depicted in FIG. 5, a rear ring gear 99 shares a common gear design with the forward ring gear 80 thus allowing them to have the same tooth form. In an embodiment not shown, the rear ring gear 99 is designed to be interchangeable with the forward ring gear 80. As known to those skilled in the art, a plurality of bearings 100 support the rear pinion gear 92 within a rear differential carrier 102. Rotation of the rear pinion gear 92 drives a rear differential 104 which in turn drives a rear axle (not shown).

A method for assembling a tandem axle 10 according to the present invention comprises locating the power divider 34 in a front portion 106 of the one-piece differential carrier 50. The input bearing 56 is located in the front portion 106 to rotatingly support the input assembly 18. Pinion gear 48 is installed into carrier 50 through pilot diameter 67 from a rear portion 108 of the carrier 50. The outer pinion bearing 62 is located on the outer pinion bearing support surface 60.

The bearing cage support surfaces 64a and 64b are used to precisely position the bearing cage 66. The bearing cage 66 is then attached to the carrier at the rear portion 108. A plurality of apertures within the bearing cage 66 are located adjacent complementary apertures within the carrier 50. Bolts 68 are located within the bearing cage apertures and the carrier apertures to prevent the bearing cage 66 from moving relative to the carrier 50.

The inner pinion bearing 74 is then located on the inner pinion bearing support surface 70 and the half differential bearing 76 is located on the half differential bearing support surface 72.

In one embodiment depicted in FIGS. 2a and 3a, the pinion bearings 62, 74 are adjusted for preload with the shim pack 63 located between inner pinion bearing 74 and bearing cage 66. In an alternative embodiment depicted in FIGS. 2b and 3b, the pinion bearings 62, 74 are advanced in and out with the threaded cup 75 to adjust their preload. An input bearing adjuster 56 is used to adjust the input bearing preload and/or endplay as known to those skilled in the art.

A plurality of apertures in the carrier 50 are aligned with complementary apertures in the axle housing 88. Bolts are located within the carrier apertures and the axle housing apertures to prevent the combined bearing cage 66 and carrier 50 from moving relative to the axle housing 88.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A drive system, comprising:
   a one-piece differential carrier housing an input assembly, a power divider, a hollow pinion gear and a wheel differential, said carrier enclosing said hollow pinion gear; and
   a through shaft concentric with, but rotating at different speeds from, said hollow pinion gear via said power divider;
   wherein said input assembly, said power divider and said pinion gear are rotatingly supported within said one-piece differential carrier by a maximum of three bearings; and
   wherein said input assembly, said power divider and said pinion gear are rotatingly supported by an input bearing, an outer pinion bearing and an inner pinion bearing;
   a bearing cage attached within said one-piece differential carrier adjacent at least one bearing cage support surface, said bearing cage supporting said inner pinion bearing and a wheel differential bearing.

2. The system of claim 1, wherein an outer pinion bearing support integrally formed with said one-piece differential carrier supports said outer pinion bearing.

3. The system of claim 1, wherein said pinion gear is rotatingly supported between said outer pinion bearing and said inner pinion bearing.

4. A drive system. comprising:
   a one-piece differential carrier housing an input assembly, a power divider, a hollow pinion pear and a wheel differential, said carrier enclosing said hollow pinion gear: and
   a through shaft concentric with, but rotating at different speeds from, said hollow pinion gear via said power divider;
   wherein said input assembly, said power divider and said pinion gear are rotatingly supported within said one-piece differential carrier by a maximum of three bearings; and wherein said input assembly, said power divider and said pinion pear are rotatingly supported by an input bearing, an outer pinion bearing and an inner pinion bearing;

a bearing cage attached within said one-piece differential carrier adjacent at least one bearing cage support surface, said bearing cage supporting said inner pinion bearing and a wheel differential bearing;

wherein a threaded inner pinion bearing cup engages complementary threads on said bearing cage to adjust inner and outer pinion bearing preload.

5. A differential system, comprising:

a one-piece differential carrier housing an input assembly, a power divider, a hollow pinion gear and a wheel differential, said one-piece differential carrier supporting an outer pinion bearing and an input bearing, and said carrier enclosing said hollow pinion gear; and a bearing cage attached within said one-piece differential carrier, said bearing cage supporting an inner pinion bearing;

wherein said input assembly, said power divider and said hollow pinion gear are only rotatingly supported by said outer pinion bearing, said inner pinion bearing and said input bearing.

6. The system of claim 5, wherein an outer pinion support integrally formed with said one-piece differential carrier supports said outer pinion bearing.

7. The system of claim 5, wherein said bearing cage has an inner pinion bearing support surface for receiving said inner pinion bearing and a wheel differential bearing support for receiving a wheel differential bearing.

8. The system of claim 5, wherein said pinion gear is rotatingly supported between said outer pinion bearing and said inner pinion bearing.

9. The system of claim 5, wherein a threaded inner pinion bearing cup engages complementary threads on said bearing cage to adjust inner and outer pinion bearing preload.

10. A method for assembling a drive system, comprising:

rotatably supporting an input assembly, a power divider and a hollow pinion gear with a maximum of three bearings within a one-piece differential carrier, said carrier having a front portion and a back portion and said carrier enclosing said hollow pinion gear;

assembling said pinion gear through said back portion of said one piece differential carrier;

attaching a bearing cage to said back portion of said one piece differential carrier; and assembling said power divider through said front portion of said one piece differential carrier.

11. The method of claim 10, further comprising rotatingly supporting said power divider and said pinion gear by an input bearing, an outer pinion bearing and an inner pinion bearing.

12. The method of claim 11, further comprising rotatingly supporting said pinion gear within said one-piece differential carrier by said outer pinion bearing and said inner pinion bearing.

13. The method of claim 10, further comprising engaging a threaded inner pinion bearing cup with complementary threads on said bearing cage to adjust inner pinion bearing and outer pinion bearing preload.

14. The method of claim 11, further comprising positioning said bearing cage on said one-piece differential carrier by utilizing a outer pinion bearing support, a bearing cage support surface and an pilot diameter.

15. The method of claim 14, further comprising precisely dimensioning said outer pinion bearing support of said one-piece differential carrier so that said outer pinion bearing only requires preload adjustment.

16. The method of claim 14, further comprising housing said power divider, said pinion gear, said input assembly and a wheel differential within said one-piece differential carrier.

\* \* \* \* \*

UNITED STATES PATENT AND TRADEMARK OFFICE
CERTIFICATE OF CORRECTION

PATENT NO.       : 7,500,934 B2                                           Page 1 of 1
APPLICATION NO.  : 10/702785
DATED            : March 10, 2009
INVENTOR(S)      : James Ziech It is certified that error appears in the above-identified patent and that said Letters Patent is hereby corrected as shown below:

Claim 4, Column 6, line 57, after the word pinion, the word "pear" should be --gear--.

Claim 4, Column 7, line 2, after the word pinion, the word "pear" should be --gear--.

Signed and Sealed this

Twenty-first Day of April, 2009

JOHN DOLL
*Acting Director of the United States Patent and Trademark Office*